United States Patent [19]

Marsh

[11] 4,254,878
[45] Mar. 10, 1981

[54] SCREEN FOR SEPARATING OBJECTS BY SHAPE

[75] Inventor: Paul G. Marsh, Hamilton, Ohio

[73] Assignee: Black Clawson Fibreclaim Inc., Middletown, Ohio

[21] Appl. No.: 69,018

[22] Filed: Aug. 22, 1979

[51] Int. Cl.³ .............................................. B07B 13/05
[52] U.S. Cl. .................................. 209/682; 209/683; 209/288; 209/920
[58] Field of Search ............... 209/920, 680, 681, 682, 209/683, 684, 685, 686, 687, 689, 284, 288, 287, 289

[56] References Cited

U.S. PATENT DOCUMENTS

| 920,972 | 5/1909 | Mathewson | 209/682 X |
| 1,955,032 | 4/1934 | Stevenson, Jr. | 209/682 X |
| 2,356,295 | 8/1944 | Yost | 209/682 |
| 3,269,534 | 8/1966 | Clark et al. | 209/682 |
| 3,389,790 | 6/1968 | Braunheim et al. | 209/680 |

*Primary Examiner*—Allen N. Knowles
*Attorney, Agent, or Firm*—Biebel, French & Nauman

[57] ABSTRACT

Mixed solid waste, such particularly as municipal waste, is subjected to treatment which separates the majority of the ferrous metal pieces from the other solids, and the invention provides apparatus for separating the resulting mass into (a) flat-shaped pieces (b) chunky-shaped pieces, and (c) long thin or otherwise oversized pieces by causing all the pieces to advance along a moving conveyor surface through successive stations at which openings of predetermined size and shape accept pieces of the (a) and (b) shapes, having only the (c) category on the conveyor.

12 Claims, 6 Drawing Figures

SCREEN FOR SEPARATING OBJECTS BY SHAPE

BACKGROUND OF THE INVENTION

This invention relates generally to the salvage and scrap, and it is particularly applicable to systems which enhance the value of pieces of ferrous metals recovered from solid waste.

The inventor of the present invention and his assignee have been active for some years in the development of apparatus, methods and systems for treating solid waste in such manner that various components thereof can be reused. Typical U.S. Pat. Nos. illustrative of that activity include Baxter 3,549,092, Blakley et al 3,595,488, Marsh 3,714,038, Marsh 3,720,380, Marsh 3,736,223, Marsh 3,830,636, Marsh 3,945,575, Marsh 3,970,254 and Marsh 4,049,391. All of those patents have a general relation to the recycling of solid waste, with the end products including ferrous metals, aluminum and other non-ferrous metals, glass, reusable paper fiber, and fuel in several forms.

The present invention was developed with the objective of enhancing the recovery of ferrous metals as an improvement on the apparatus, methods and systems disclosed in the above listed patents. The disclosures of all of those patents have in common the basic aspects of a wet process for the treatment of solid waste in which the principal steps comprise delivering unsorted solid waste, in essentially asreceived condition, to a pulper wherein it is reduced to a slurry form while effecting segregation and separation from the slurry of the great majority of pieces of ferrous metal which resist the comminuting action of the pulping process. The pulped slurry is extracted from the pulper and treated in accordance with one or more of the listed patents to effect separate recovery of aluminum, glass, fiber, and organic residue suitable for conversion to fuel and other end products.

The present invention was developed with particular relation to recovery of the ferrous metal pieces which are separated from the slurry during the pulping process. In general, the majority of these pieces can be classified as one of three shape categories, namely flat shapes comprising predominantly steel cans and the like which have been flattened by the action within the pulper, chunky shapes of generally clindrical, spherical or block-like configuration, and long thin shapes such as pieces of pipe, rod, stiff wire and the like.

In addition to the shapes which characterize each of these categories, the categories differ from each other in the metallurgy of their component pieces. Thus in the flat shape catagory, the predominant components are tin plated cans, and the chunky category also contains substantial quantities of tin plate in the form of large cans and pieces of sheet metal which have been formed into ball shapes by the rotor action in the pulper. On the other hand, the rod-like pieces, plus the occasional large chunky or block-like pieces, are generally of cast iron or steel of maximum value as scrap.

The factors just discussed dictate that if the different shapes of metal pieces can be sorted into appropriate categories prior to their disposal for reclamation as scrap, they will have correspondingly increased value. Prior to the present invention, however, no commercially available equipment has been found which will effectively separate flat pieces from rod-like pieces, nor which will effectively separate flat pieces from generally spherical or cylindrical pieces having comparable maximum dimensions.

SUMMARY OF THE INVENTION

The present invention is directed to the purpose outlined in the previous section, and has the specific objective of providing apparatus which will effectively separate a mass of heterogeneously-shaped solid pieces into the three categories of (i) flat shapes, (ii) chunky shapes, and (iii) long thin shapes. The invention was developed to accomplish these results in the processing of solid waste in a system of the type shown in the above referenced patents, and especially the ferrous metal pieces separated from the other components of solid waste in the course of reducing those other components to slurry form in the pulping stage of such a system.

In accordance with the invention, the metal pieces to be sorted are delivered as they come from the pulper to a conveyor system which includes a surface defining an extended path and means for causing the metal pieces to travel along the path defined by that surface. In the preferred embodiment, the conveyor system includes an extended horizontal surface and means for vibrating that surface at sufficient amplitude and frequency to cause the successive metal pieces to travel continuously along it and to cause the long pieces to align themselves with their direction of travel.

Stations are provided along the conveyor system corresponding respectively to the three categories into which the successive metal pieces are to be separated, commencing with the flat shapes because experience has shown that they constitute by far the largest of the three categories. The flat shape station is followed by the chunky shape station. This will leave on the conveyor the rod-type pieces and relatively large pieces, which are readily separated as desired.

The flat shape station is characterized by a series of openings of particular dimensions and characteristics in the conveyor surface. In a specific installation, these openings are rectangular and of a dimension lengthwise of the conveyor equal to approximately one-half the maximum dimension of flat pieces to be removed. Each opening is provided with a bottom wall which is inclined downwardly from the downstream edge of the opening at a relatively small angle, e.g. 25° or less, away from the direction of travel along the conveyor surface. This bottom wall cooperates with the upstream edge of the opening to define a slot-shaped hole of relatively small width along the upstream edge of the opening.

In operation, as successive pieces of metal advance along the conveyor surface, the vibrating action also causes individual pieces to tend to align their maximum dimension along the conveyor path. As a result, when each relatively flat piece reaches one of these openings, it will travel across the opening until its trailing edge passes the upstream edge of the opening. Then if it is not more than twice as long as the lengthwise dimension of the opening, it will tend to tilt backwards and thereby to slide down the bottom wall of the opening and through the slot at the rearward edge of the wall. Longer pieces, however, will continue to travel across the opening and will not be removed at that station.

Pieces of other shapes, such for example as generally ball or cylinder shapes of a minimum dimension greater than the slot width, may tend first to drop into a flat shape opening but cannot pass through the slot. In that position, they obstruct the downstream passage of subsequent pieces until the latter tend to force them out of the opening and further along the conveyor surface. This clearing action is facilitated by the ramp action of the bottom wall of the opening, which is one of the reasons for maintaining it at a relatively small angle of inclination with respect to the conveyor surface. Also if the amplitude of the vibratory action is adequately high, that will tend to cause such pieces to be bounced out of the openings.

The chunky shape station is located downstream from the flat shape station because flat shapes predominate as already noted, and it is therefore easier to handle the chunky shapes after at least a majority of the flat shapes have been screened out. The chunky shape station is provided with a plurality of holes formed completely through the conveyor surface, with no bottom wall above a lower level to which anything passing through the hole will drop. These holes may be rectangular or circular, and preferably have somewhat smaller dimensions in the plane of the conveyor surface than the flat shape openings.

Each of the above stations extends for a substantial distance along the conveyor surface, for example 12 feet for the flat shape station and 8 feet for the chunky shape station, and the holes in each section are arranged in spaced and alternating relation such that in the aggregate, they span the entire width of the conveyor surface and each hole is in line lengthwise of the conveyor surface with a plurality of additional holes.

The pieces which pass both the flat shape and chunky shape stations will in the main comprise pieces of too large overall size for acceptance by the holes at either of the first two stations, and pipe, rods and other pieces of relatively small cross-section but lengths greater than twice the lengthwise dimension of any of the first two holes. These pieces are generally of steel of sufficiently comparable metallurgical properties to be used as scrap without further sorting, and they are simply removed at the discharge end of the conveyor. If, however, it is desired to sort them, the large pieces are readily separated manually from the long pieces.

DESCRIPTION OF THE PREFERRED EMBODIMENTS

Figure 1:
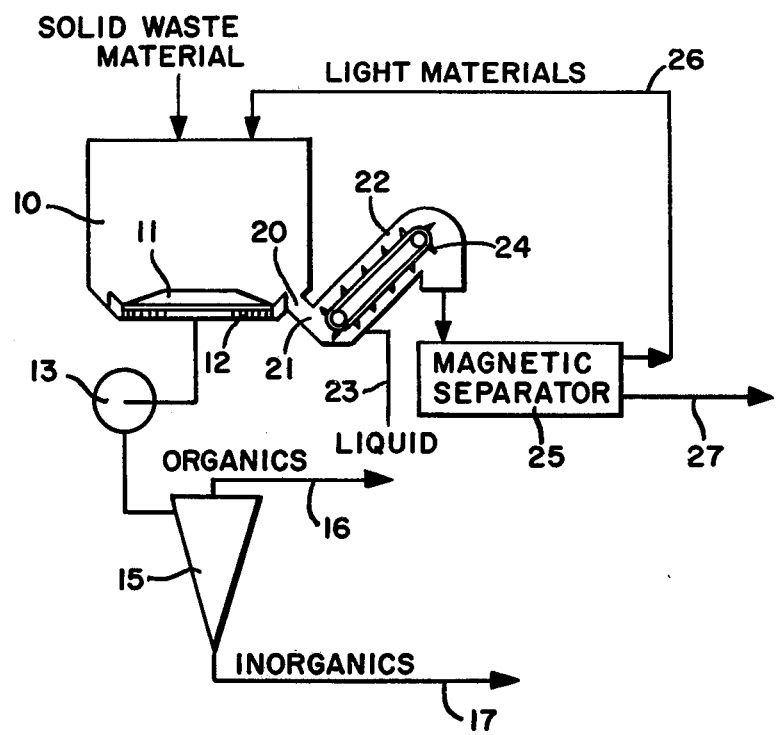
FIG. 1 is a diagrammatic view illustrating a portion of a solid waste treatment system which produces a mass of metal pieces to be separated in accordance with the invention.

In the practice of the invention as illustrated in FIG. 1, heterogenous solid waste materials are deposited in a treatment vessel 10, which is preferably a pulper of the construction shown in Blakley et al U.S. Pat. No. 3,595,488, and which includes a rotor 11 rotating above a perforated bed plate 12. The perforations in the bed plate 12 are generally of uniform size in a range of 1 to 2 inches in diameter, and the frangible solids mixed with water in the pulper are reduced by the mechanical and hydraulic shear forces created by the rotor to a slurry of particles small enough to pass through the bed plate perforations. This slurry is discharged to a pump 13 which feeds it to a hydrocyclone 15 where the solids are separated into organics and inorganics and transmitted downstream as indicated at 16 and 17 to further treatment stations in accordance with one or more of the other patents listed hereinabove.

The action of the pulper on the relatively infrangible solids is of greater importance to the present invention. In particular, it has the result of compacting metal cans into generally flattened shapes, and of bending or breaking off projections from relatively chunky solid pieces and thereby roughly rounding them off.

An outlet 20 at one side of the pulper tub connects through a chute 21 with the bottom of a junk remover tower 22, and in the normal operation of this type of pulper, the discharge to the junk remover will consist primarily of the metal components of the solid waste and other relatively infrangible materials capable of resisting comminution by the pulping action of the pulper or which have been flattened or rounded off in the pulper. Commonly, make-up water is added to the bottom of the junk remover, as indicated at 23, at a rate sufficient to maintain the desired level in the pulper, and to wash back into the pulper as much as possible of the organic material entrained with the heavy waste pieces, and also the cans which have not yet been flattened and are therefore still relatively buoyant.

A conveyor 24 within the tower 22 carries the accumulated solids to the discharge outlet from the tower, through which the solid materials are delivered to a magnetic separator 25 for separating the ferrous metal pieces from other solids. The latter are commonly recirculated to the tub for further comminution, as indicated by the line 26, while the ferrous metal pieces are transmitted from the separator as indicated at line 27.

The present invention is particularly concerned with further sorting of the ferrous metal pieces represented by the line 27. As already noted above, these pieces have been found by experience to fall primarily into the three categories of flat shapes, chunky shapes, and rod-like long thin shapes, with a small remainder of relatively large and irregular shapes. The primary purpose of the invention is to sort these pieces in accordance with their shapes for subsequent recycling, and in the preferred practice of the invention, the discharge of ferrous metal pieces from the separator 25 is delivered to the feed end of a conveyor system best illustrated in FIGS. 2–5.

Figure 2:
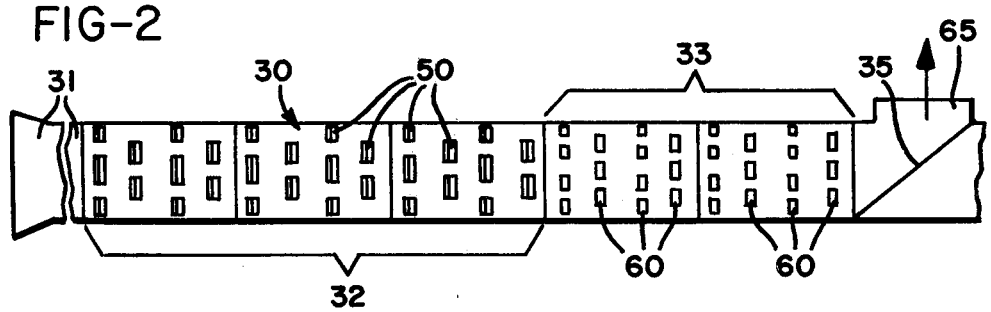
FIG. 2 is a diagrammatic plan view illustrating one form of the separating apparatus of the invention.
Figure 3:
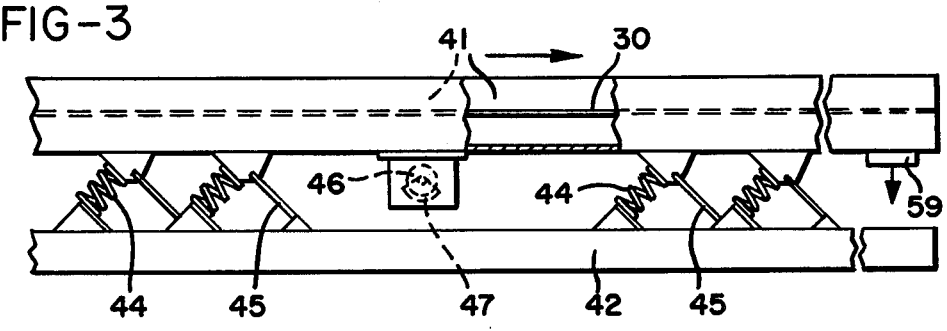
FIG. 3 is a fragmentary side view of the apparatus of FIG. 2.

In FIGS. 2–3, the conveyor comprises an elongated deck 30 providing a horizontal surface defining an extended path along which the materials from the separator 25 are caused to travel. In one operating embodiment of the invention, the screen deck is 30 inches wide and comprises a receiving station 31 to which the pieces to be sorted are initially delivered, a flat shape station 32, a chunky shape station 33, and a third station where a fence 35 deflects the rod-like shapes and miscellaneous large pieces from the deck.

The screen deck 30 forms an upper level of a tray unit 40 which has side walls 41 and is mounted for vibratory movement in the direction of its length on a base 42, by means of multiple springs 44 and stabilizing links 45. A conventional vibratory drive is represented by a motor 46 mounted on the tray 40 and driving an eccentric weight 47. A vibration amplitude of at least $\frac{1}{2}$ inch to $\frac{3}{4}$ inch is preferred at a frequency in the range of 800 to 1,000 cycles per minute. The receiving station 31 is preferably of sufficient length to assure that the long pieces initially delivered thereto will respond to the vibrating action by aligning themselves with their direction of travel to the flat shape station 32.

As shown in FIG. 2, the flat shape station comprises a portion of the screen deck 30 provided with multiple rectangular openings 50 arranged in rows extending both lengthwise and crosswise of the deck in spaced relation such that in the aggregate, these openings extend entirely across the width of the deck, and at every point crosswise of the deck, there will be a plurality of openings 50 aligned with each other lengthwise of the deck. The configuration of the individual openings and their spacing are critical to the effectiveness of the invention, as now explained.

Figure 4:
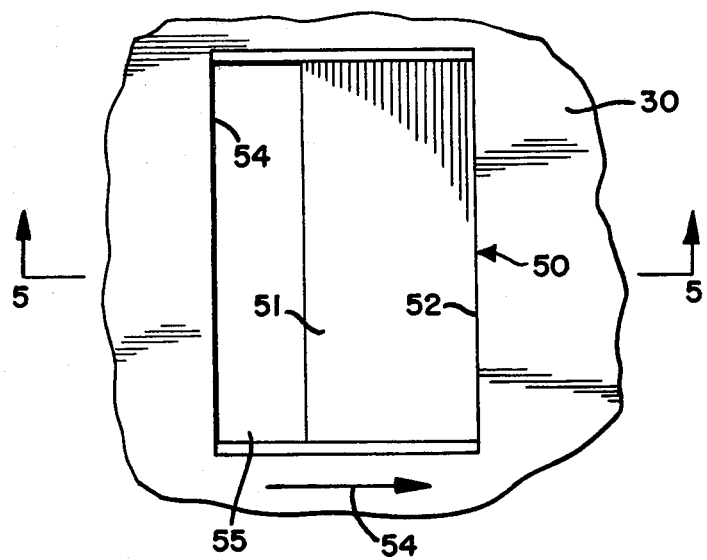
FIG. 4 is an enlarged fragmentary view illustrating one of the openings in the apparatus of FIG. 2 for removing flat-shaped pieces from the mass produced by the system of FIG. 1.
Figure 5:
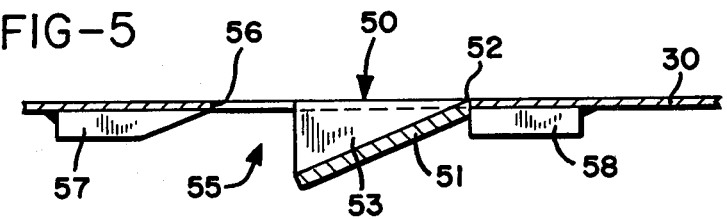
FIG. 5 is a section on the line 5—5 of FIG. 4.

Referring particularly to FIGS. 4 and 5, each opening 50 is rectangular as viewed from above, but it has a bottom wall 51 which is inclined downwardly from the downstream edge 52 of the opening and away from the direction of travel (arrow 54) along the deck 30 at a relatively small angle to the horizontal, preferably 25° or less but at least about 15°, and which is connected with the deck 30 along its side edges by side walls 53. The length of this bottom wall 51 is less than the dimension of the hole 50 lengthwise of the deck 30 so that it defines with the upstream edge 56 of the opening a slot-like hole 55 through the deck. The underside of the deck 30 is reinforced by plates 57 and 58 welded thereto along the upstream and downstream edges of opening 50.

The dimensions of each opening 50 are selected to control the size and shape of the metal pieces capable of being accepted by each of these openings. In an operating example of the invention, the overall dimensions of each opening 50 are 7 inches measured crosswise of the deck 30 and 4¼ inches measured lengthwise of the deck. But the bottom wall 51 is in turn so dimensioned that the vertically projected width of the slot 55 is 1½ inches, so that the effective width of the slot is approximately 2 inches.

In operation, the vibratory movement of the deck 30 causes the successive metal pieces delivered to the receiving station 31 tend to align themselves lengthwise of the deck as they travel along toward the flat shape station 31. As each such flat piece longer than 4¼ inches reaches one of the openings 50, it will tend to travel across the opening, and if its length is greater than twice the lengthwise dimension (4¼ inches) of the opening, it will continue past the opening. If, however, its length is not more than about 8 inches in the above example, when its trailing end passes the edge 56 of the opening, the piece will tilt backwards onto the bottom wall 51, slide down the wall in the reverse direction from its direction of travel along the deck, and if it is not more than 2 inches thick, pass through the slot 55 to the tray 40 below it. Thus the maximum dimension of the flat pieces accepted by each opening 50 will be substantially twice the distance between its upstream and downstream edges 52 and 56.

All pieces which are thus accepted by the openings 50 will then continue in their original direction of travel along the tray 40 until they reach a discharge opening at the downstream end of the tray 40, which is shown as an opening 59 in the bottom of the tray but can as well be at the end of the tray. These pieces will generally be relatively flat, and will be limited to those having a dimension of not more than about two inches such that they can pass through one of the slots 55. The great majority of such pieces, however, will have at least one dimension greater than two inches, since smaller pieces will be extracted through the bed plate 12. Obviously, the openings 50 are also capable of accepting rod-like pieces of a diameter less than 2 inches and lengths of 8 inches or less, but experience has proved that most rod-like pieces in solid waste are of greater length, and will travel over the openings 50 without dropping into them, and that the total number of such pieces which are accepted by the openings 55 is not sufficiently large to represent a serious contaminant of the pieces accepted by those openings.

The openings 50 will have a tendency to trap chunky particles too large for acceptance through the slots 55, but this trapping action has been found to be only temporary. The effects of the vibratory action of the deck 30, the pressure of additional pieces traveling along the deck which engage trapped pieces, and the relatively small angle of inclination of the bottom walls 51 combine so that these walls act as a ramp along which trapped pieces are pushed upward and onward along the deck. Thus in the installation where the invention has been tested, the flat shape station has been found to be essentially self-clearing, as well as highly effective in accepting the flat pieces which predominate in the mass initially delivered from the junk remover 22.

Since a time interval is sometimes needed to clear a given opening 50 of trapped chunky pieces, those pieces will act temporarily as dams for oncoming pieces, and this is an important consideration in the lateral spacing of the openings 50. This is because rod-like pieces which encounter such a temporary obstruction will tend to be turned from their normal lengthwise direction of travel to a position crosswise of the deck 30. If there were another opening 50 too close laterally to the opening where the obstruction has occurred, this changed position of a rod-like piece could cause it to be accepted by an opening 50, which is not desired.

Such result is prevented by spacing laterally adjacent openings 50 by a distance at least twice as great as the lateral dimension of the individual openings. In this way, a rod-like piece which is turned from its lengthwise position of travel by a temporary obstruction at an opening 50 will clear the closest laterally adjacent opening and have opportunity to realign itself lengthwise of the deck before it encounters another opening 50. For the same reasons, preferred spacing of the openings 50 lengthwise of the deck 30 should be at least four times the maximum dimension of an opening, to provide space wherein a rod-like piece which has been turned crosswise of the deck can realign itself lengthwise of the deck.

In the installation wherein the invention has been tested, the station 32 along deck 30 provided with openings 50 for flat pieces is 30 inches wide and 12 feet long, and it is followed by an 8-foot long station 33 for removing the chunky-shaped metal pieces which are rejected by the openings 50. These chunky pieces commonly include a substantial number of tin plated cans, as well as plated sheet metal, which have been formed into more or less ball shapes by the mechanical action of the pulper rotor 11, and they have also been found to include a substantial number of generally cylindrical pieces such particularly as used automobile oil filters.

The station 33 is provided with multiple holes 60 in the deck 30 which are sized to accept chunky pieces like those described in the preceding paragraph, and which it is desirable to separate from the essentially iron and steel pieces of larger dimensions. Satisfactory results from this standpoint have been achieved by providing the portion of the deck 30 in the station 33 with multiple throughholes 60 of rectangular shape, 2½ inches by 4 inches, spaced in generally the same relationship with each other as the openings 50 in the flat shape station to span the width of deck multiple times.

The shapes and dimensions of these openings are less critical than for the openings 50, and round openings are acceptable so long as they are limited in their overall dimensions to provide the desired split between the chunky objects of the type described and the long and larger chunky pieces which have the highest iron and steel content with minimum plating. Otherwise, the station 33 operates similarly to the station 32, accepting whatever pieces are presented to the holes 60 of a size which will pass through them, and conveying them along the tray 40 to a discharge opening similar to the openings 59 as described.

The rod-like and otherwise over-sized pieces will travel across the holes 60 to the final station where the fence or wall 35 under which the conveyor deck 30 passes will deflect whatever remains on the deck to the lateral discharge position 65. As previously noted, these over-sized pieces can be disposed of for recycling as a single category, but if desired, the relatively small number of irregularly shaped pieces can be separated manually or mechanically from the pipe and rod-like pieces which constitute by far the larger proportion.

In the embodiment shown in the drawings, the screening apparatus of the invention is located downstream from the magnetic separator 25 so that ferrous metals will by far predominate in the materials delivered thereto, but this is not essential to the invention. The apparatus will work equally effectively if its receiving station 31 is located for direct delivery of solids from the junk conveyor 24, but in such installations, it will be desirable to provide a magnetic separator in the path of the accepted material from each of the successive sections of the conveyor deck 30.

Figure 6:
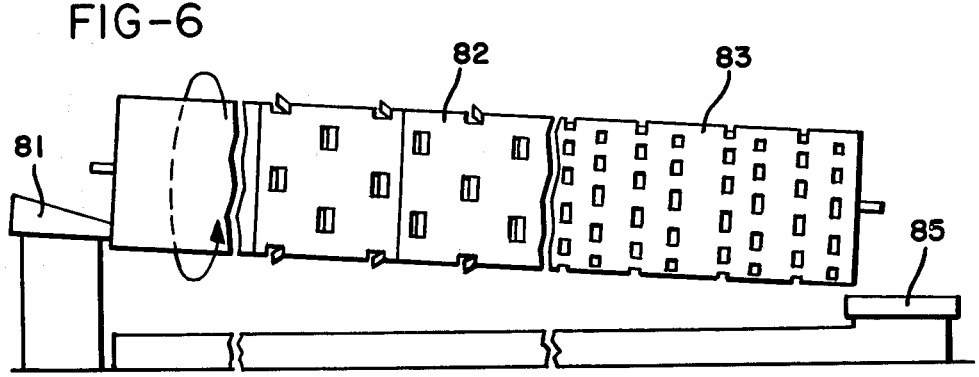
FIG. 6 is a diagrammatic side view illustrating another embodiment of the invention.

Preferred results in the practice of the invention have been obtained with a vibratory flat conveyor as described, but the principles of the invention can also be embodied in a conveyor wherein at least the flat shape and chunky shape stations comprise slowly rotating and slightly tilted cylindrical screens of the trommel type. Thus as indicated diagrammatically in FIG. 6, the conveyor as a whole comprises a slightly tilted chute 80 to which the pieces delivered from the separator 25 slide into the imperforate cylindrical receiving station 81 of a trommel screen which includes a flat shape station 82, a chunky shape station 83, from which the over-sized pieces pass to a final station 85.

The screen portions 82 and 83 are provided with openings corresponding in configuration and arrangement to the openings 50 and 60 already described and functioning in the same manner. These openings are shown diagrammatically, but in the trommel screen, these openings are preferably spaced more widely than in the case of the flat deck 30, due to the fact that the individual pieces will travel circumferentially of the screen as well as lengthwise thereof. Accordingly, the spacing of these openings circumferentially of the screens should be at least four times the maximum desired accepted length of pieces, and the spacing lengthwise of the screens should similarly be at least four times the maximum desired accepted length of piece.

It is to be understood that although the invention was developed as an addition to a solid waste handling system employing a wet (pulping) process, it is not limited to that application, nor to the sorting of any particular type of scrap. In addition, while the forms of apparatus herein described constitute preferred embodiments of the invention, it is to be understood that the invention is not limited to these precise forms of apparatus, and that changes may be made therein without departing from the scope of the invention.

What is claimed is:

1. Apparatus for use in the processing of scrap to separate essentially flat-shaped pieces of a predetermined maximum dimension from a mass of pieces also including thin shapes of a greater maximum dimension and chunky shapes, comprising:
   (a) conveyor means including a surface defining an extended path and means for effecting movement of said surface causing said mass to travel along said path with respect to said surface,
   (b) a portion of said surface being provided with a plurality of generally rectangular openings arranged in spaced relation both lengthwise and cross-wise of said surface and with the upstream and down-stream edges thereof respectively substantially perpendicular to the length of said path and spaced from each other by a distance substantially equal to one-half said predetermined maximum dimension,
   (c) each of said openings having a bottom wall which is stationary with respect to said surface and is inclined downwardly from the downstream edge thereof at a relatively small angle away from the direction of travel of said mass to define a slot-shaped hole between the lower edge of said wall and the upstream edge of said opening,
   (d) whereby as a flat-shaped piece whose dimension along said path is less than twice the corresponding dimension of said opening travels across said opening, it will tilt backward when the trailing end thereof clears said upstream edge of said opening and slide down said bottom wall to said hole in the reverse direction from the travel of said mass.

2. Apparatus as defined in claim 1 further comprising side walls extending between the side edges of each of said bottom walls and the side edges of the associated said opening.

3. Apparatus as defined in claim 1 wherein the spacing between adjacent said openings crosswise of said surface is greater than the maximum dimension of each said opening, said openings being located so that in the aggregate they span the width of said surface.

4. Apparatus as defined in claim 3 wherein each of said openings has at least one additional said opening aligned therewith lengthwise of said surface and spaced therefrom by a distance at least twice as great as said maximum dimension of said opening.

5. Apparatus as defined in claim 3 wherein each of said openings has at least one additional said opening aligned therewith lengthwise of said surface and spaced therefrom by a distance at least four times as great as said maximum dimension of said opening.

6. Apparatus as defined in claim 1 wherein said angle of inclination of said bottom wall is not greater than approximately 25° to facilitate dislodgment from said openings of pieces too large for passage through said slot-shaped holes.

7. Apparatus as defined in any of claims 1, 3, 4 and 5 wherein said conveyor means comprises an essentially horizontal surface and means for vibrating said surface.

8. Apparatus as defined in claim 1 wherein said conveyor means comprises a cylindrical member with the interior surface thereof defining said path, and means for rotating said cylindrical member about the central axis thereof to cause said mass to travel both axially and circumferentially of said surface.

9. Apparatus as defined in claim 1 wherein said conveyor means comprises a cylindrical member with the interior surface thereof defining said path, and means for rotating said cylindrical member about the central axis thereof to cause said mass to travel both axially and circumferentially of said surface, wherein the spacing between adjacent said openings circumferentially of said surface is at least four times as great as the maximum dimension of each said opening, and wherein the distance between adjacent said openings lengthwise of said surface is at least four times as great as said maximum dimension of each said opening.

10. Apparatus for use in the processing of solid waste to separate a mass of metal pieces into three categories of (i) flat shapes of a predetermined maximum dimension, (ii) thin shapes of a greater maximum dimension and (iii) chunky shapes, comprising:

(a) conveyor means including a surface defining an extended path and means for effecting movement of said surface causing said mass to travel along said path with respect to said surface, (b) means defining a series of stations along said path corresponding respectively to said three categories, (c) said flat shape station comprising an initial portion of said surface provided with a plurality of generally rectangular openings arranged in spaced relation both lengthwise and crosswise of said surface portion and with the upstream and downstream edges thereof respectively substantially perpendicular to the length of said path and spaced from each other by a distance substantially equal to one-half said predetermined maximum dimension, (d) each of said openings have a bottom wall which is stationary with respect to said surface and is inclined downwardly from the downstream edge thereof at a relatively small angle away from the direction of travel of said mass to define a slot-shaped hole between the lower edge of said wall and the upsteam edge of said opening, (e) whereby as a flat-shaped piece whose dimension along said path is less than twice the corresponding dimension of said opening travels across said opening, it will tilt backward when the trailing end thereof clears said upstream edge of said opening and slide down said bottom wall to said hole in the reverse direction from the travel of said mass while chunky and longer thin pieces travel past said opening, (f) said chunky shape station comprising a second portion of said surface located downstream from said flat shape station and provided with a plurality of holes arranged in spaced relation both lengthwise and crosswise of said surface portion, (g) each of said chunky shape holes extending completely through said surface and being sized to accept chunky pieces incapable of passage through one of said slot-shaped holes, and (h) means located downstream from said chunky shape station for receiving from said surface the thin pieces rejected by both of said first two stations.

11. Apparatus as defined in claim 10 wherein said conveyor means comprises an essentially horizontal surface and means for vibrating said surface.

12. Apparatus as defined in claim 10 wherein said conveyor means comprises a cylindrical member defining each of said flat shape and chunky shape stations with the inner surfaces thereof defining corresponding portions of said path, and means for rotating each of said cylindrical members about the central axis thereof to cause said mass to travel both axially and circumferentially of said inner surfaces.

* * * * *